United States Patent [19]
Hsu

[11] Patent Number: 5,775,994
[45] Date of Patent: Jul. 7, 1998

[54] METHOD FOR AUTOMATICALLY ACTIVATING A CONTROL PROCEDURE AT A USER'S GAME SYSTEM THROUGH A BROADCAST NETWORK WHEN SAID USER'S LICENSE IS EXPIRED

[75] Inventor: Shih-Pin Hsu, Hsin-Chu, Taiwan

[73] Assignee: United Microelectronics Corp., Hsin-Chu City, Taiwan

[21] Appl. No.: 579,556

[22] Filed: Dec. 27, 1995

[51] Int. Cl.$^6$ .................................................. G06F 15/16
[52] U.S. Cl. ..................... 463/29; 395/186; 395/712; 380/25; 380/4
[58] Field of Search ..................... 463/1, 24, 29, 463/30, 31, 36, 40, 41, 42; 348/1, 5.5, 6, 7, 12, 13, 3, 4, 460, 552; 380/3, 4, 25, 5, 6, 7, 9, 10, 21; 395/186, 712, 187.01; 364/410

[56] References Cited

U.S. PATENT DOCUMENTS

| | | | |
|---|---|---|---|
| 4,685,055 | 8/1987 | Thomas | 380/4 |
| 4,924,378 | 5/1990 | Hershey et al. | 380/4 |
| 4,937,863 | 6/1990 | Robert et al. | 380/25 |
| 5,023,907 | 6/1991 | Johnson et al. | 380/4 |
| 5,113,518 | 5/1992 | Durst, Jr. et al. | 395/186 |
| 5,375,206 | 12/1994 | Hunter et al. | 395/712 |
| 5,444,780 | 8/1995 | Hartman, Jr. | 380/25 |
| 5,497,479 | 3/1996 | Hornbuckle | 364/410 |
| 5,548,645 | 8/1996 | Ananda | 380/25 |
| 5,579,222 | 11/1996 | Bains et al. | 395/712 |

Primary Examiner—Jessica Harrison
Assistant Examiner—Mark A. Sager
Attorney, Agent, or Firm—Seed and Berry LLP

[57] ABSTRACT

The present invention discloses a computer software protection method which is especially applicable to video game titles broadcast via cable TV and satellites. The invention can detect invalid licenses and then automatically activate control procedures at the user site. The invention utilizes the natural properties of oscillators which has a normal distribution of frequencies. Consequently, if two timing instruments using different kinds of oscillators have been synchronized first, comparing their time deviation can tell how much time has past since their synchronization date. Accordingly, we can detect if a user's license is expired by comparing the time deviation between both sites. If the deviation exceeds a predetermined value which means the user's license is expired, then various control procedures will be automatically activated at the user site.

8 Claims, 7 Drawing Sheets

METHOD FOR AUTOMATICALLY ACTIVATING A CONTROL PROCEDURE AT A USER'S GAME SYSTEM THROUGH A BROADCAST NETWORK WHEN SAID USER'S LICENSE IS EXPIRED

BACKGROUND OF THE INVENTION

A. Field of the Invention

The present invention relates to a method for automatically activating control procedures at the user site when the user's license is expired, especially to software protection method for video game software broadcast via cable TV or satellites.

B. Description of the Prior Art

Most video game systems available on the market include a game console for executing video game titles and a game cartridge for storing video game software programs. When playing, the user only needs to plug the game cartridge into the game console. FIG. 1 shows the structure of a conventional video game system. The video game system includes game console 101, joystick 102, game cartridge 103 and display 104. The game program is stored in ROM 111 of game cartridge 103, which is usually Mask ROM or EPROM. When game cartridge 103 is plugged into game console 101, game console 101 accesses the programs stored in ROM 111 of game cartridge 103 via address bus 112 and data bus 113. Programs read from game cartridge 103 are executed by CPU (Control Process Unit) 105. RAM 108 that is also called "working RAM" or "WRAM" temporally stores data of game parameter when CPU 105 is processing game titles. PPU 106, VRAM 110, PSG 107, and video signal synthesizer 109 are used for processing game animation and background music or sound effects.

The disadvantage for the conventional game systems is that a user has to purchase various kinds of game titles to play. Currently there is a broadcast method for distributing game titles to the user site via cable TV or satellites. A user only need a game console and a receiver to get the broadcast game software.

FIG. 2 shows a typical broadcast software system. The main difference between FIG. 2 and FIG. 1 lies in the part of receiving cartridge 203. Receiving cartridge 203 replaces the function of game cartridge 103 because video game titles are now downloaded from the broadcast site 216. Referring to FIG. 2, broadcast site 216 refers to the broadcast station of cable TV or satellites. Broadcast site 216 broadcasts game titles to the user site. Receiver 214 receives the game titles and then converts them into digital signals which are further forwarded to memory device 217 via data bus 213. Game console 201 accesses game titles stored in memory device 217 for program executions. The function of game console 201 is basically the same as game console 101 in FIG. 1.

FIG. 3 is another schematic diagram showing broadcast site 316 distributes video game software to the user site. FIG. 3 and FIG. 2 are very similar. The difference also lies in the part of receiving cartridge 303. Refer to FIG. 2, receiver 214 shares the same data bus 213 with memory device 214. In contrast, in FIG. 3 data bus 315 only transfers data from receiver 314 to memory device 317. Receiver 314 converts broadcast signals from a cable TV station or a satellite into digital data which is further sent to memory device 317. CPU 305 reads instructions and data stored in memory device 317 as addresses are sent from CPU 305 through address bus 312. This type of memory is dual port memory. It means the paths of data write-in and read-out are different.

Comparing to conventional game cartridges, the method of broadcasting game titles can save the cost for purchasing game cartridges. In addition, the user can always receive the most up-to-date video game titles. Nevertheless, the disadvantage for this broadcasting method is that it is relatively more difficult to inhibit unauthorized use of the software programs. As rental is concerned, the issues for the vendors are: how to correctly detect unauthorized licenses and how to effectively activate control procedures at the user site when a user's licenses is expired.

SUMMARY OF THE INVENTION

It is therefore the goal of the present invention to provide a broadcast software protection method which can automatically activate control procedures at the user site by computing the time deviation between the timing signals generated from the user site and the broadcast site.

It is another object of the invention to provide an efficient and yet simple software protection method which does not store user's rental information in local memory device so that no information will be cracked and no implementation cost for a memory device is necessary.

It is a further object of the invention to provide a reliable software protection method that can automatically activate control procedures at the user site to terminate program executions.

It is yet another object of the invention to provide a software protection method which is hard to break by utilizing the natural property of oscillators built in timing instruments.

It is still another object of the invention to provide an on-line timing control method which can authorize user's license and extend user's license immediately right after their subscription.

According to the objects mentioned above, the invention discloses a broadcast software protection method which is applicable especially to video game software programs distributed via cable TV or satellites. The invention detects invalid licenses by comparing the time deviation of timing signals generated by the timing instrument at the broadcast site and the user site. When a user's license is authorized, the timing signals of the timing instrument at the user are site is synchronized according to the timing signals of the timing instrument at the broadcast site. The broadcast site broadcasts current timing signals to the user site along with software programs. The user's game console reads the current timing signals and then compares it with its own timing signals. If the time deviation between both sites exceeds a predetermined range of values, then the game console automatically activates control procedures at the user site to terminate program executions.

These and other objects and the advantages of the present invention will become obvious to those of ordinary skilled in the art after having read the following detailed description of the preferred embodiment which is illustrated in the various figures and drawings.

DETAILED DESCRIPTION OF THE PREFERRED EMBODIMENTS

The invention is characterized by being able to detect invalid licenses and then automatically activate control procedures at the user site based on the time deviation between the broadcast site and the user site. It is known that an oscillator, such as a quartz crystal, produces an extremely steady fixed oscillation at frequency around 3.579545 MHz. Due to different manufacturing processes, the frequency of oscillators varies with slight deviation around 1 ppm. That is, as the time goes by, the better quality of the oscillator is, the less deviation of frequency it will be. For this reason, the broadcast site should use an oscillator of the best quality and be referred as standard time. Each user also keeps a timing instrument in his/her own game system which is usually implemented as a real-time clock. Nevertheless, the quality of the oscillators applied in the user site depends on their effective dates of licenses. Tracing on their deviations with the standard broadcast time can tell how much time has passed since the time when their licenses are issued.

Once a user's license is authorized, the user's timing instrument is synchronized according to the timing signals at the broadcast site. The synchronization procedure can be set manually. That is, when the user's license is authorized, they will get new timing instruments already tuned for their game systems. For convenience, the synchronization procedure can also be efficiently achieved on-line based on users' IDs. The advantage for the on-line authorization is like "pay and play." The user can subscribe the game titles by simply making a call to the vendor. The broadcast site can immediately issue his/her license and then synchronize their timing instruments on-line.

If the time deviation exceeds a predetermined range of values, it means the user's license is expired. Thus, the game console at the user site automatically activates a control procedure to terminate program executions. Since the quality of each oscillator is not exactly the same, therefore even if two users are authorized the licenses at the same time, their expiration dates will not always be the same. This unstableness becomes another protection for the vendors because it is hard to learn the secret of causing such difference and thus make the invention more difficult to break.

Figure 4:
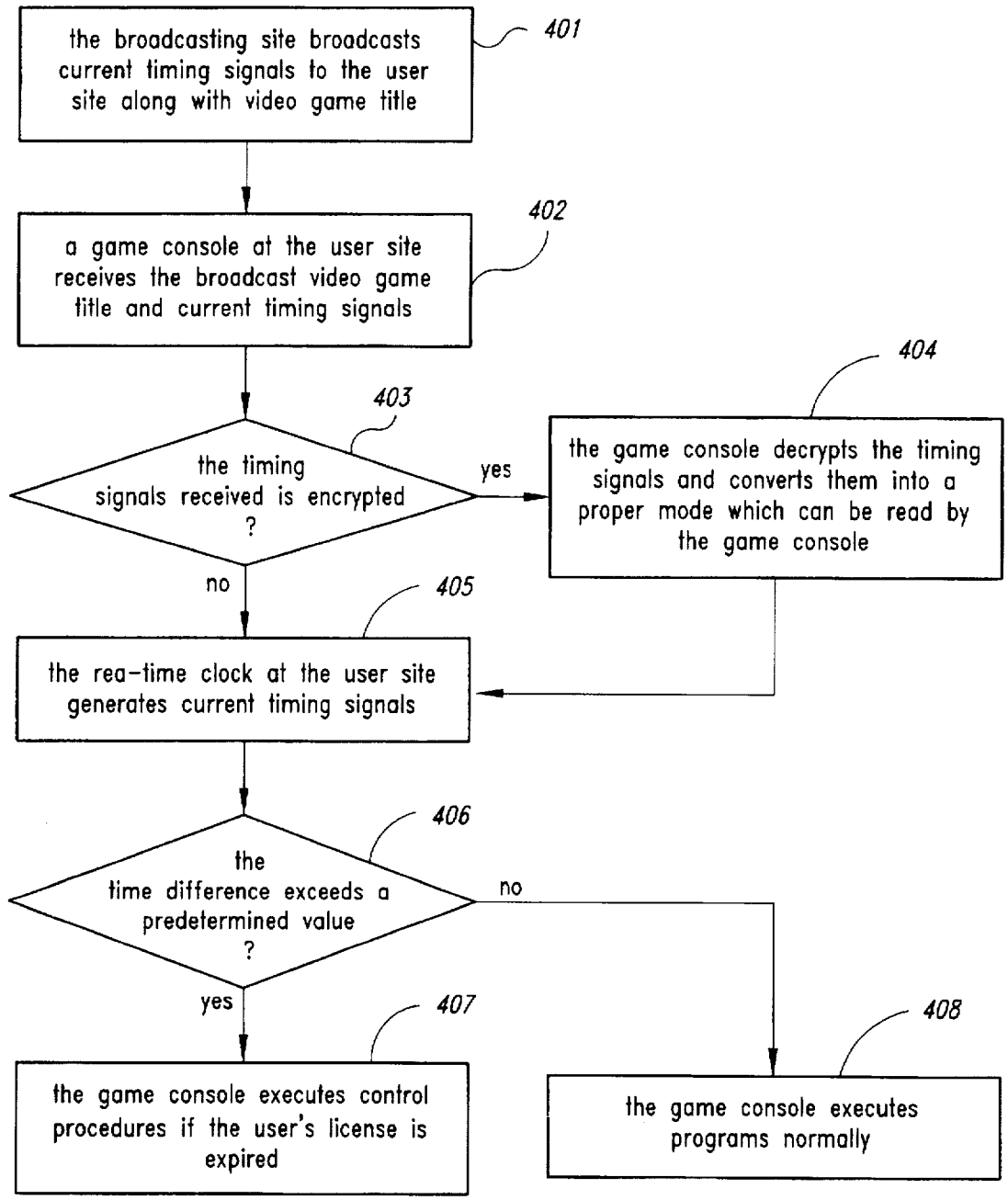
FIG. 4 is a flowchart showing the execution steps according to the present invention.

The steps of the invention can be illustrated more clearly by the flowchart shown in FIG. 4. Assume that the synchronization procedure has already been done. Refer to FIG. 4, the steps are as follows:

401: the broadcast site broadcasts current timing signals to the user site along with video game titles;

402: the game console at the user site receives the broadcast video game title and current timing signals;

403: the game console detects if the timing signals received is encrypted; if yes, execute 404; otherwise, execute 405;

404: the game console decrypts the timing signals and converts them into a proper mode which can be read by the game console;

405: the real-time clock at the user site generates current timing signals;

406: the game console computes the deviation between the timing signals at the user site and the broadcast site to see if the deviation exceeds a predetermined value; if yes, execute 407, otherwise, execute 408;

407: the game console executes control procedures if the user's license is expired;

408: the game console executes programs normally.

The computation performed by step 406 can be implemented by software or hardware. There are several approaches for control procedures at step 407: for instance, (1) using software programs to enforce CPU to execute programs abnormally; (2) using software programs to terminate the execution of the CPU; (3) using software programs to display figures and texts on the screen to notify the user that his/her license is expired; (4) using RAM or receiver with the functions of switching modes for controlling program execution; switching to normal mode will cause programs to execute normally; switching to error mode will enforce RAM or receiver to output error data and then cause programs to run abnormally; (5) using hardware circuit or control signal to enable a signal generator to generate interrupted signals and thus interfere system bus; (6) using hardware circuit to reset system and directly enforce CPU to terminate program execution. The methods stated above can interfere program execution directly or indirectly for the purpose of software protection.

Figure 1:
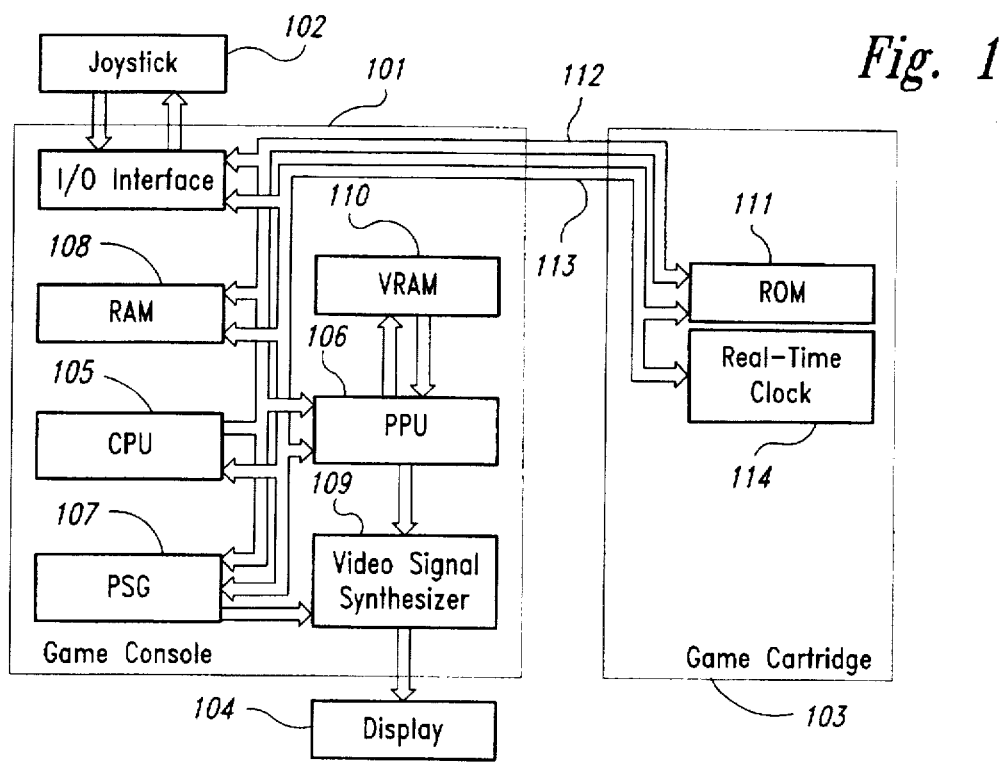
FIG. 1 is a schematic diagram showing a conventional video game system.
Figure 2:
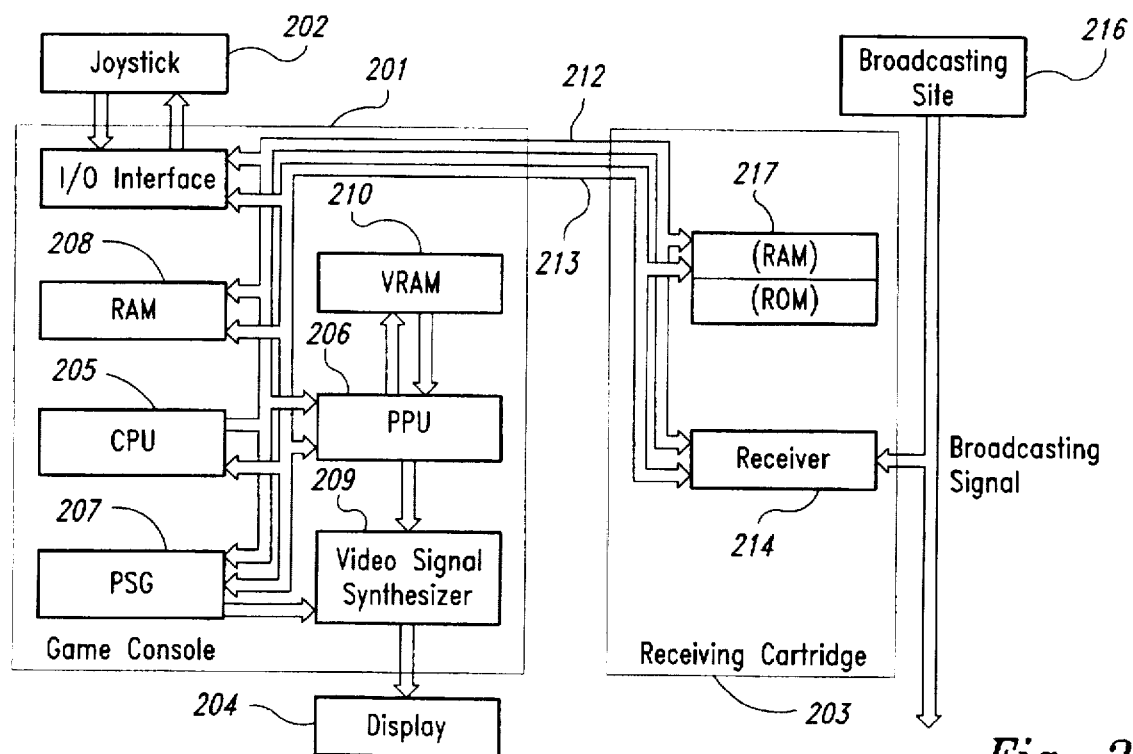
FIG. 2 is a schematic diagram showing a broadcasting video game system.
Figure 5:
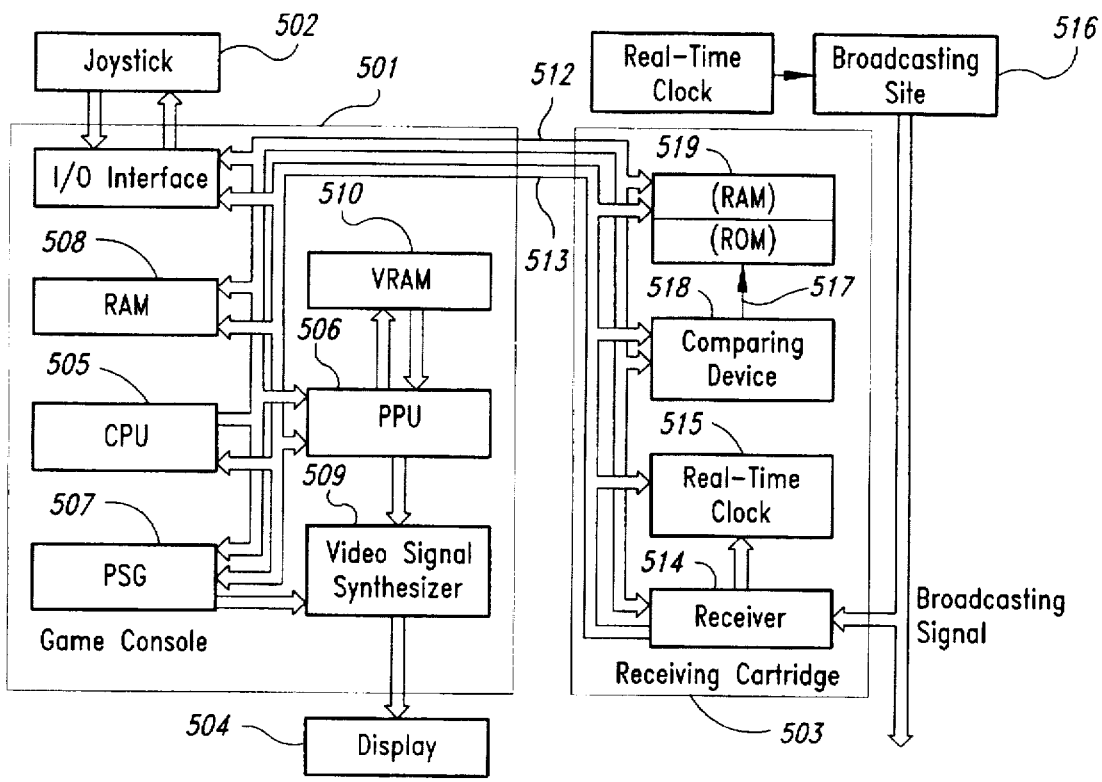
FIG. 5 is a schematic diagram showing the preferred embodiment of the present invention based on the broadcasting video game system as illustrated in FIG. 2.

FIG. 5 shows a preferred embodiment of the present invention based on the schematic diagram of FIG. 2. Broadcast site 516 broadcasts current timing signals at the broadcast site along with software programs to the user site. The local current timing signals are generated by the real-time clock in receiving cartridge 503. Current timing signals can be represented in conventional time representations, such as "01:15:95" for "Jan. 15, 1995". It can also be represented in binary numbers. Suppose the time precision is based on hours. We may use 16 bits to represent year, month, date, and hour. Let the first four bits be years after 1990. Thus, "0010 0011 0100 0011" will represent 1992, Mar., 8th, 3:00 am. There are a variety of time representations. It all depends on application.

Receiving cartridge 503 receives broadcast video game software and current timing signals from the broadcast site 516. The two current timing signals are then forwarded to comparing device 518. Comparing device 518 compares the time deviation between the timing signals from both sides to see if the deviation exceeds a predetermined value. It shall be mentioned that comparing device 518 is only for simple computation, so it can be replaced by software programs. If the deviation is still within a predetermined value, it means the user's license is not expired yet. Otherwise, a control procedure at the user site is activated to disturb the execution of CPU 505. The control procedure is activated via control line 517 of RAM 519. RAM 519 contains two modes: Mode 0 and mode 1. Mode 0 is defined as normal mode which causes RAM 519 to generate correct data. Mode 1 is error mode which causes RAM to generate corrupted data. If the user's license is expired, control line 517 outputs 1 which switches RAM 519 to error mode and enforces CPU 505 to produce undesirable results. Otherwise, control line 517 outputs 0 which switches RAM 519 to correct mode and allows CPU 505 to perform normally.

Figure 6:
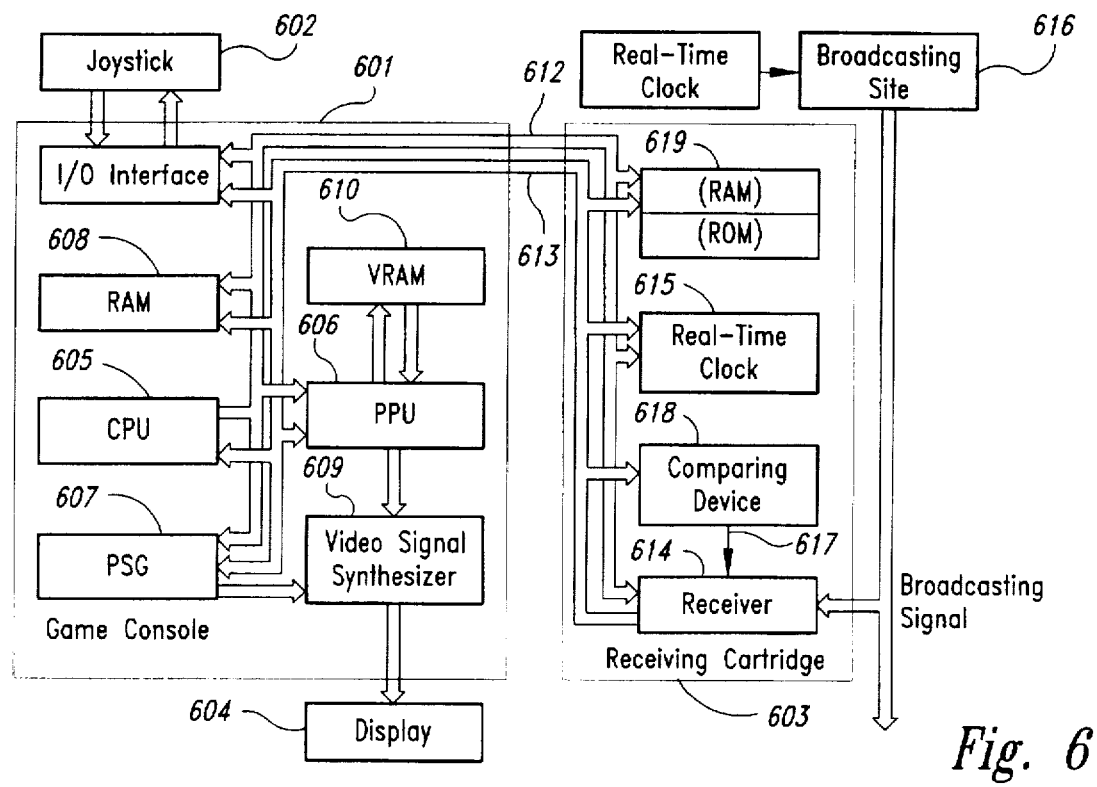
FIG. 6 is a schematic diagram showing another preferred embodiment of the present invention based on the broadcasting video game system as illustrated in FIG. 2.

FIG. 6 shows another preferred embodiment of the present invention based on the schematic diagram of FIG. 2. Its function is very close to that of FIG. 5. The difference lies in where control line 617 is connected to. In FIG. 6, control line 617 is connected to receiver 614 because the function of switching modes is now taken place by receiver 614. In normal mode, receiver 610 allows correct data to be sent to system bus. In error mode, receiver 610 generates corrupted data to system bus.

Figure 3:
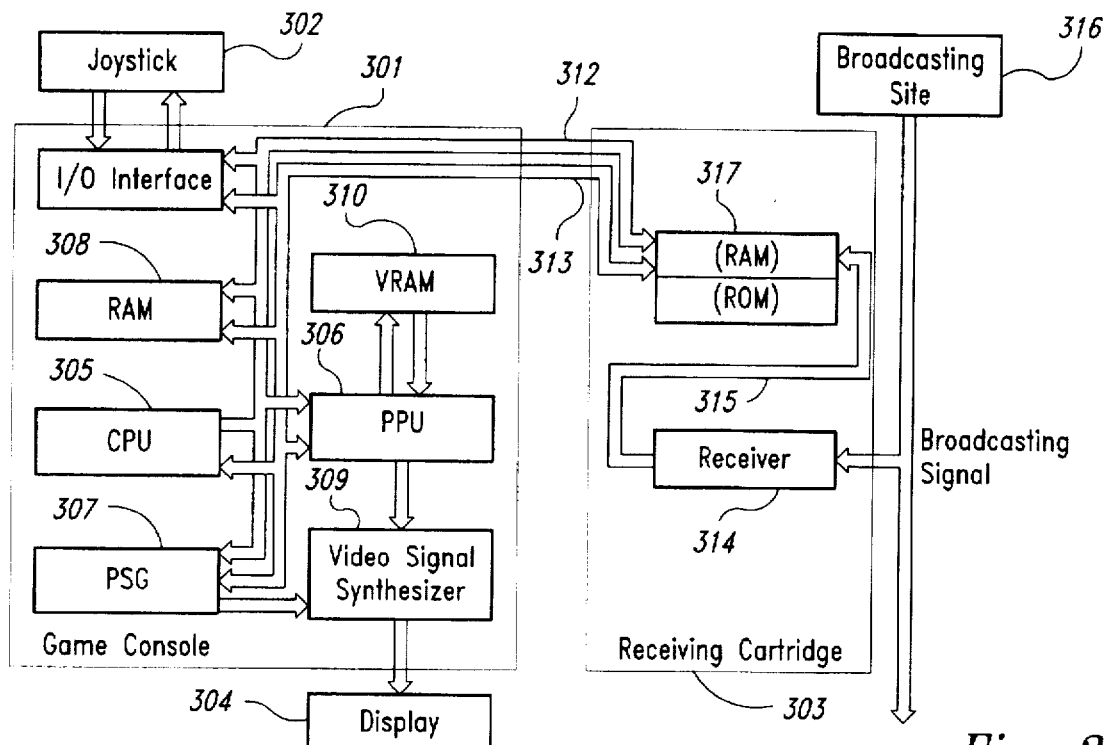
FIG. 3 is another schematic diagram showing a broadcasting video game system.
Figure 7:
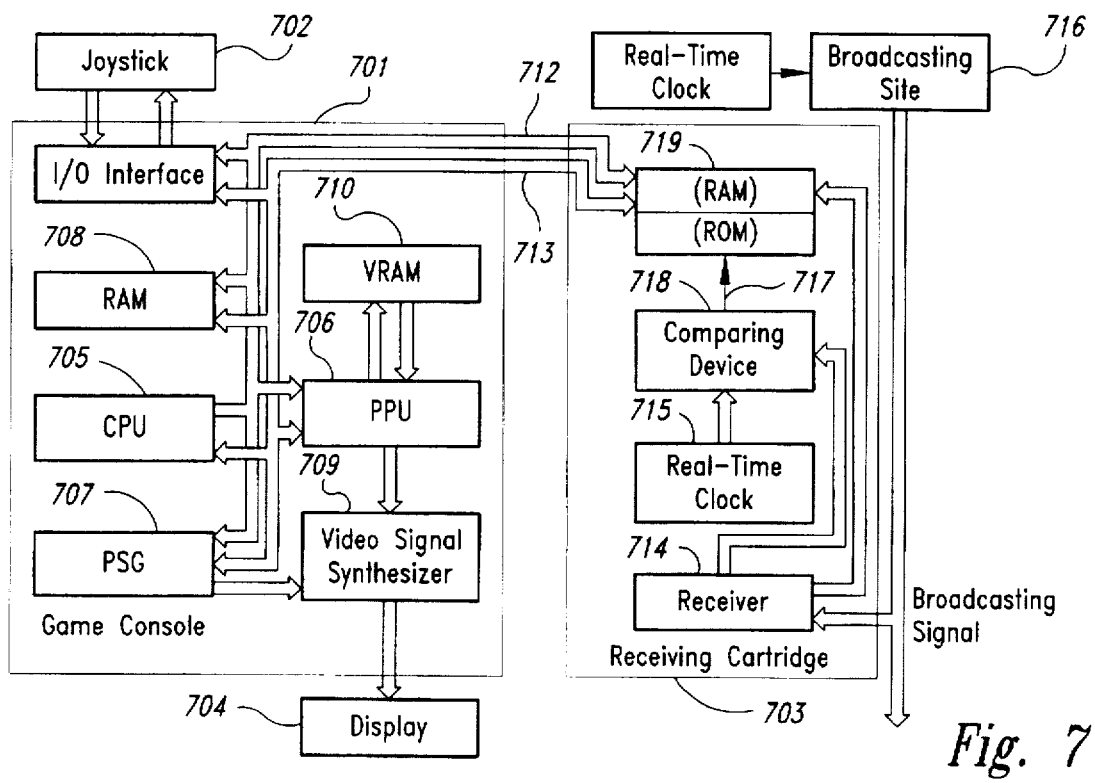
FIG. 7 is a schematic diagram showing a preferred embodiment of the present invention based on the broadcasting video game system as illustrated in FIG. 3.

FIG. 7 shows another preferred embodiment of this invention based on the schematic diagram of FIG. 3 in which the control is taken place by comparing device 718 and RAM 719. Refer to FIG. 7, comparing to real-time clock 715 to real-time clock 715 and receiver 714 to the timing signals from both sites. When the time deviation is computed, the result is sent to RAM 719 via control line 717. The function of RAM 719 is the same with that of RAM 519 which can control program execution based on two modes. For the functions of the two modes, please refer to FIG. 5.

Figure 8:
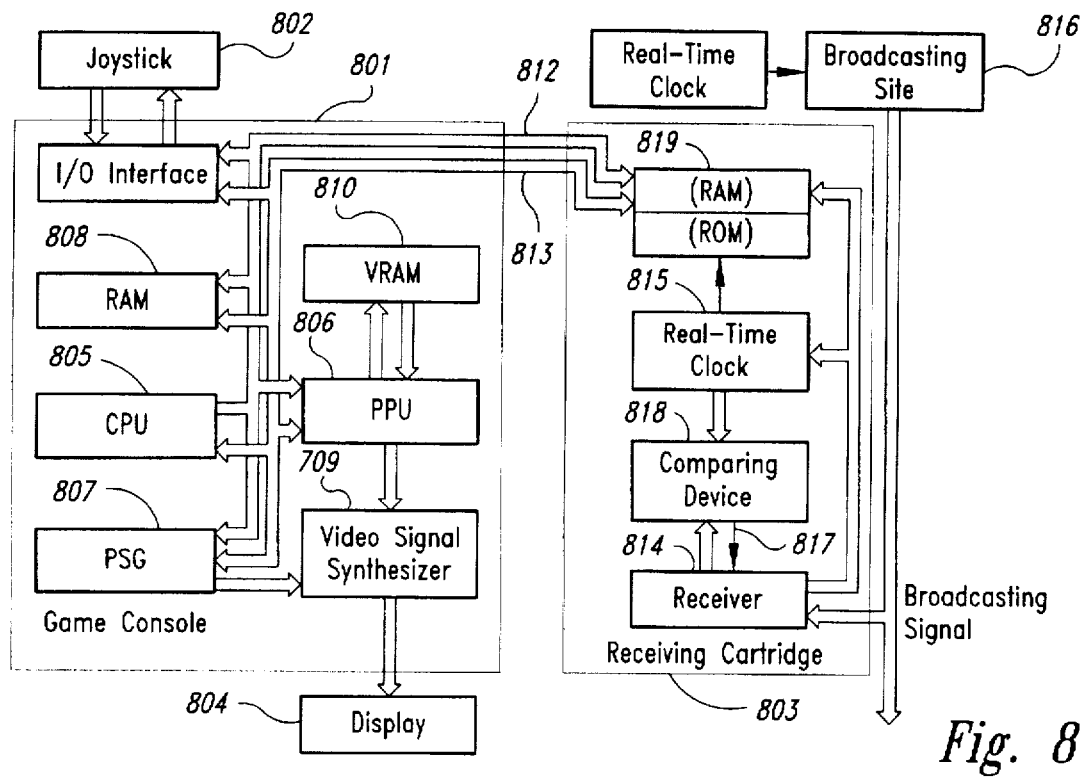
FIG. 8 is a schematic diagram showing another preferred embodiment of the present invention based on the broadcasting video game system as illustrated in FIG. 3.

FIG. 8 shows another preferred embodiment of the present invention based on FIG. 3. Its function is similar to the combination of FIG. 7 and FIG. 6. Now program control is on receiver 814 and comparing device 818. The function of comparing device 818 stays the same as in FIG. 7. The difference lies in where control line 817 is connected to. Control line 817 connects to receiver 814.

Receiver 814 also has two modes as in FIG. 6. For the details of the two modes, please refer to FIG. 6.

Figure 9:
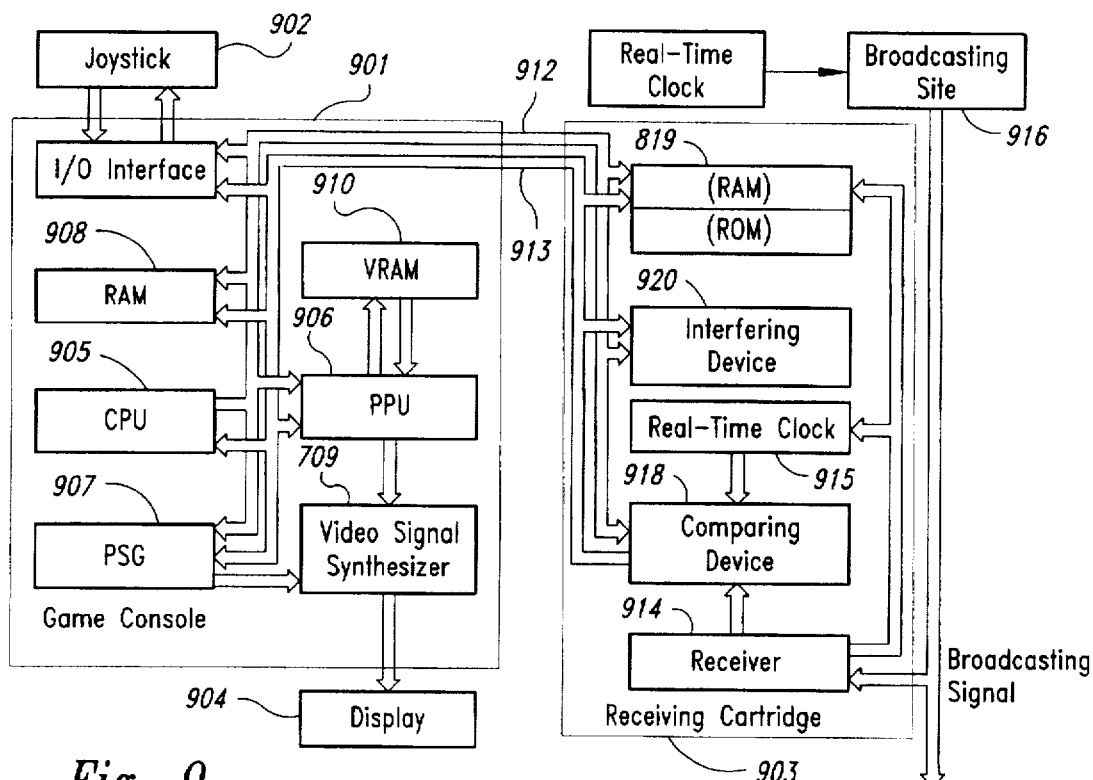
FIG. 9 is a schematic diagram showing another preferred embodiment of the present invention built-in with an interfering device.
Figure 10A:
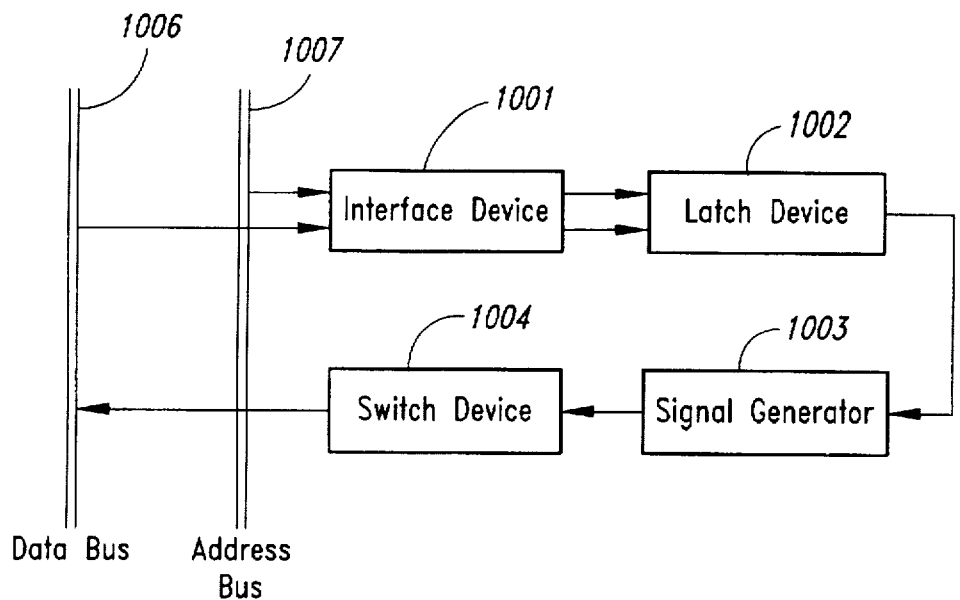
FIG. 10A is a schematic diagram showing an interfering system according to the present invention.
Figure 10B:
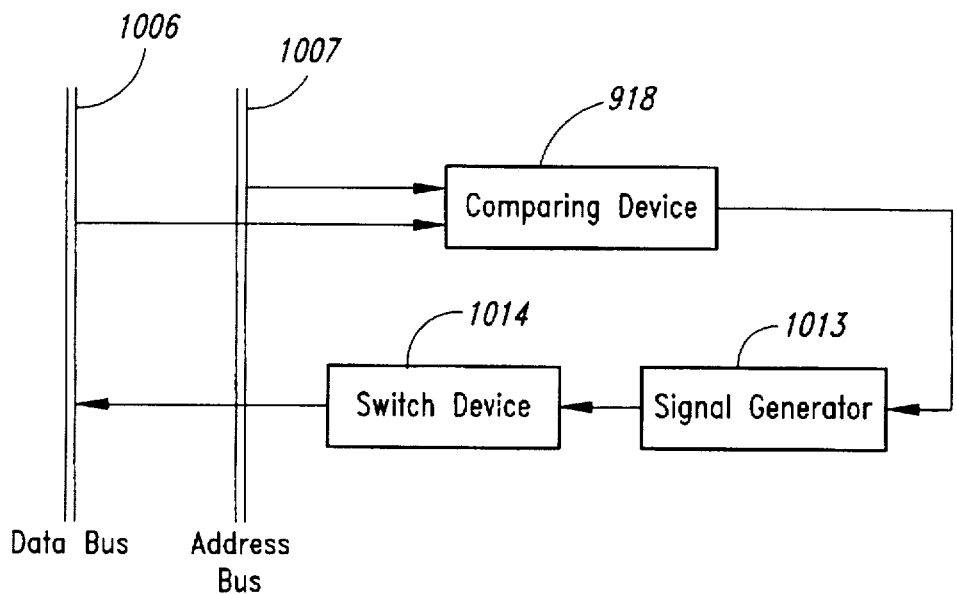
FIG. 10B is a schematic diagram showing another interfering system according to the present invention.

FIG. 9 shows an interfering device 920 implemented in a preferred embodiment of the invention based on FIG. 2. The detailed description of the interfering device is disclosed in FIG. 10A, and 10B. FIG. 10A shows an implementation of the interfering device 920 as shown in FIG. 9 to interfere system bus. The interfering device 920 generates interrupted signals to interfere data bus 912 and address bus 913. When the user's license is expired, the software control program in the user site sends a control signal to latch device 1002 via interface device 1001 to enable signal generator 1003. Latch device 1002 can be implemented as a latch or a flip-flop. Signal generator 1003 can be a counter or a random number generator. Signal generator 1003 which is enabled by the enabling signal from latch device 1002 produces a series of signals to switch device 1004. Switch device 1004 can be implemented as NOMS, PMOS, or transistor. Its function is to drive data bus 1006 to a predetermined level, such as (Vcc) or logic low (GND). Signal generator 1003 as in FIG. 10A can also be enabled by comparing device 918 in FIG. 9. As the result is computed, comparing device 918 sends a control signal to enable signal generator 1013. The function of signal generator 1013 and switch device 1014 remains the same as in FIG. 10A.

Figure 10C:
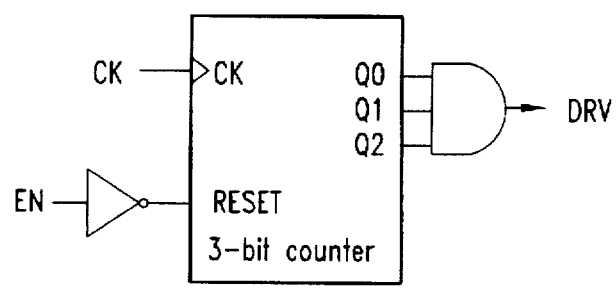
FIG. 10C is a schematic diagram showing the preferred embodiment of a signal generator.

An example of signal generator 1003, 1013 is disclosed in FIG. 10C. It can be a 3-bit counter that generates driving signals to interfere data transmission in system bus.

Figure 11:
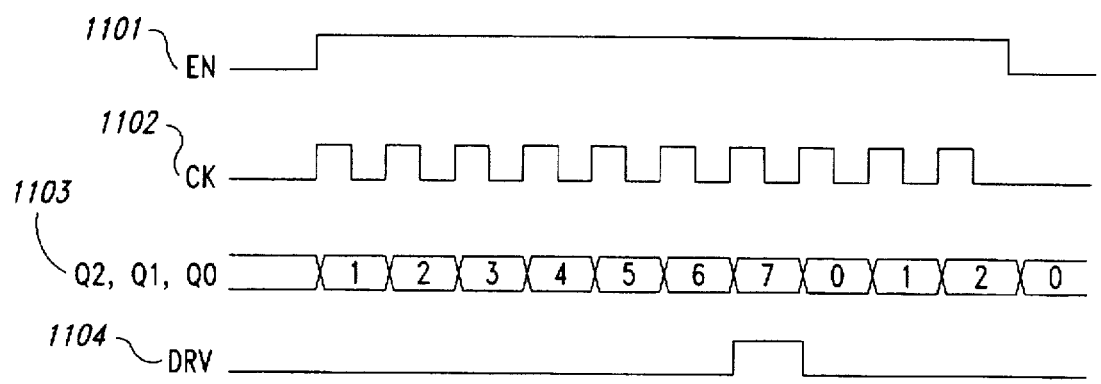
FIG. 11 is a timing diagram showing the states when the signal generator is enabled.

The timing diagram as shown in FIG. 11 can illustrate the functions of the signal generator and switch device more clearly. Refer to FIG. 11, switch signal is enabled at Q2, Q1, and Q0 when they are equal to 7(decimal). During the enabling time interval 1001, signal generator outputs digits from 0 to 7. When the signal generator outputs 7, the signal generator enables switch device to drive data bus to VCC or GND.

It should be understood that various alternatives to the structures described herein may be employed in practicing the present invention. It is intended that the following claims define the invention and that the structure within the scope of these claims and their equivalents be covered thereby.

What is claimed is:

1. A method for automatically activating a control procedure at a user's game system through a broadcast network when said user's license is expired, wherein said user's game system having at least dual-mode means, and a broadcast site having a timing instrument for generating standard timing signals, said method comprising the steps of:

selecting an oscillator for said timing instrument of said user's game system;

synchronizing timing signals generated by said oscillator with said standard timing signals;

broadcasting said standard timing signals to said user's game system periodically along with broadcast game programs;

reading said standard timing signals from said broadcast game programs at said user's game system;

computing a deviation between said standard timing signals and said timing signals generated by said oscillator; and enabling said dual-mode means to error mode when said deviation exceeds a limit of accuracy.

2. The method as claimed in claim 1, wherein the quality of said oscillator selected for said user's game system depends on the effective dates of said user's license.

3. The method as claimed in claim 1 further comprising:

encrypting said standard timing signals at said broadcast site before broadcasting to said user's game system; and decrypting said standard timing signals at said user's game system when reading said standard timing signals from said broadcast signals.

4. The method as claimed in claim 1, wherein said dual-mode means is RAM, receiver, or comparing means.

5. The method as claimed in claim 1, wherein said enabling step further comprising:

enabling said dual-mode means to correct mode when said deviation remains within said limit of accuracy.

6. The method as claimed in claim 5, wherein said interfering step comprising:

driving said system bus to logic high or logic low randomly.

7. A method for-automatically activating a control procedure at a user's game system through a broadcast network when said user's license is expired, wherein said user's game system comprising at least a system bus, and a broadcast site having a timing instrument for generating standard timing signals, said method comprising the steps of:

selecting an oscillator for said timing instrument of said user's game system;

synchronizing timing signals generating by said oscillator with said standard timing signals;

broadcasting said standard timing signals to said user's game system periodically along with broadcast game programs;

reading said standard timing signals from said broadcast game programs at said user's game system;

computing a deviation between said standard timing signals and said timing signals generated by said oscillator; and interfering said system bus of said user's game system when said deviation exceeds a limit of accuracy.

8. A method for automatically activating a control procedure at a user's game system through a broadcast network when said user's license is expired, wherein said user's game system having at least a Central Processing Unit, and a broadcast site having a timing instrument for generating standard timing, signals, said method comprising the steps of:

selecting an oscillator for said timing instrument of said user's game system;

synchronizing timing signals generated by said oscillator with said standard timing signals;

broadcasting said standard timing signals to said user's game system periodically along with broadcast game programs;

reading said standard timing signals from said broadcast game programs at said user's game system;

computing a deviation between said standard timing signals and said timing signals generated by said oscillator; and enforcing said Central Process Unit to terminate program execution when said deviation exceeds a limit of accuracy.

* * * * *